United States Patent [19]

Moller et al.

[11] Patent Number: 5,576,040
[45] Date of Patent: Nov. 19, 1996

[54] PROCESS FOR THE STERILE FILTRATION OF MILK

[75] Inventors: Wolfgang Moller, Oberusel; Wolfgang Stephan, Stadtprozelten; Henry Hies, Rodermark, all of Germany

[73] Assignee: Biotest Pharma GmbH, Dreieich, Germany

[21] Appl. No.: 282,256

[22] Filed: Jul. 29, 1994

[30] Foreign Application Priority Data

Aug. 9, 1993 [DE] Germany .......................... 43 26 665.7

[51] Int. Cl.$^6$ .................................................. A23C 9/14
[52] U.S. Cl. .................. 426/271; 426/330.2; 426/491; 426/495; 426/580
[58] Field of Search ................ 426/271, 330.2, 426/491, 495, 580

[56] References Cited

U.S. PATENT DOCUMENTS

| | | | |
|---|---|---|---|
| 4,529,542 | 7/1985 | Umezawa et al. | 260/112 |
| 4,803,089 | 2/1989 | Chaveron et al. | 426/239 |
| 4,876,100 | 10/1989 | Holm et al. | 426/491 |
| 5,256,437 | 10/1993 | Degen et al. | 426/580 |

FOREIGN PATENT DOCUMENTS

| | | |
|---|---|---|
| 0471890 | 2/1992 | European Pat. Off. . |
| 2579421 | 10/1986 | France . |
| 3626498 | 2/1988 | Germany . |
| 2050797 | 1/1981 | United Kingdom . |
| 8601687 | 3/1986 | WIPO . |

OTHER PUBLICATIONS

Munir Cheryan, Ultrafiltration Handbook, Technomic Pub. Co., Lancaster, Penn, 1986 pp. 3 & 60, 174–187.
Mother, J., Neth. Milk Dairy Journal, vol. 41, 137–145, (1987).
Malmberg, R.,North European Food & Diary Journal, vol. 54(1), pp. 30–32 (1988).
Woychik, J. et al, Journal of Food Science, vol. 57, 1, pp. 46–58 (1992).
Aoki, T. et al, Journal of Diary Research, vol. 55, 189–195, (1988).

*Primary Examiner*—Esther Kepplinger
*Assistant Examiner*—Curtis E. Sherrer
*Attorney, Agent, or Firm*—Sprung Horn Kramer & Woods

[57] ABSTRACT

The present invention relates to a process for obtaining sterile milk, wherein the calcium ion content is reduced preferably to half of the naturally occurring amount by means, for example, of ion exchange or dialysis, and the milk is then filtered sterile, and if desired calcium ions are added again to restore the natural content.

The product thus obtained has all of the biological activities as well as virtually the original composition, but it is free of bacteria, fungi and spores and will keep for a longer time.

18 Claims, No Drawings

PROCESS FOR THE STERILE FILTRATION OF MILK

The present invention relates to a process for obtaining a sterile milk, wherein the calcium ion content is reduced preferably to half of the amount naturally present by means of ion exchange or dialysis, for example, and the milk is then filtered to sterility, re-adding calcium ions to restore the natural content, if desired.

The product thus obtained has all its biological activities as well as virtually its natural composition, but it is free of bacteria, fungi and spores and will keep for a relatively long time.

The secretion of the female mammary gland, referred to hereinafter simply as milk, is as a rule sterile or contains but very few bacteria if it is obtained under aseptic conditions. Milk, however, is very quickly contaminated by microorganisms from the environment (air, the cow, the milker, the milk tank, etc.).

Since due to its composition of carbohydrates, proteins, fats, minerals and vitamins milk is an ideal culture medium for virtually all microorganisms, milk spoils within a short time. Refrigerating the milk retards bacterial growth slightly and extends its keeping qualities by a few days.

Due to its high protein content and its greater basic burden of germs, the milk of the first 5 days after calving, the colostral milk, does not keep as long as normal milk and spoils within 1 to 2 days despite refrigeration at 2° to 8° C.

In addition to the bacteria that sour milk, such as lactobacilli, humanopathogenic bacteria especially constitute a great problem. These include various pathogenic strains of *salmonella, campylobacter, listeria* and *staphylococci*, which can occur especially in nonpasteurized milk, or also *clostridia* or *bacillus* species, which due to their heat-resistant spores can survive pasteurization at 62° to 74° C.

Sterile milk is obtained by what is called UHT treatment, i.e., a heat treatment at 120° C. to 145° C. for a few seconds. This milk has a decidedly poorer flavor than milk not treated by UHT. In addition to the typical "boiled taste" a loss of the activity of biologically active substances in the milk must be reckoned with. These include especially the valuable immunologically active components present in the milk from the first days after calving—the colostral milk—such as, for example, immunoglobulins and other immunity stimulating substances, as well as other important proteins, such as lactoferrin, lactoperoxidase, growth factors, etc. Only a biologically active colostral milk, however, can be used for, among other things, the treatment of gastrointestinal disorders in men and animals.

Furthermore, toxins can be released from bacteria by heat activation. Especially for the endotoxins of gram-negative bacteria ever more stringent limits in the milk are being defined, since these toxins are not destroyed by pasteurization. In UHT sterilization, the killing of gram-negative bacteria can increase the endotoxins by a factor of 6 to 7 (Motter, J., Neth. Milk Dairy Journal, Vol. 41, 137–145, 1987).

There is therefore a need for a process for separating bacteria and spores reliably from milk instead of simply killing them.

One step in this direction is the BACTOCATCH process of Alfa-Laval of Sweden, in which tangential microfiltration reduces the bacteria in milk by 99.6% and thus improves the keeping quality of milk by about 50% (Malmberg, R., North European Food and Dairy Journal, Vol. 54 (1), pp. 30–32, 1988). Since membranes with a pore size of more than 0.2μ have to be used for such filtration, no sterile end product can be obtained, unavoidably resulting in a slightly improved but still decidedly limited keeping quality.

In European patent application EP 0 471 890, a process is described for treating a colostral milk by reversible acidification, i.e., by the addition of acid and caustic soda solution, such that it can then be sterilized by filtration. This process is applicable only to colostral milk, but not to normal milk which is of a definitely different composition.

However, the filterability of normal milk as required for sterilization is problematical. The reason lies in the casein present in the milk. If the casein is separated, by acid precipitation for example, the whey that results is much more easily filtrable.

About casein it is known that it forms micelles, which are stabilized by calcium phosphate bridges. The size of the predominant number of these micelles runs from 20 to 300 nm. It would normally be expected, therefore, that the predominant number of micelles would pass through a 0.2 μm membrane. Woychik, J. et al. (Journal of Food Science, Vol. 57, 1, pp. 46–58, 1992), however, were able to show that in the case of a microfiltration through 0.1 μm and 0.2 μm membranes a large number of micelles with a diameter less than 100 nm are unable to pass through the membrane.

Casein is one of the most hydrophobic proteins and also tends to enter hydrophobic interactions with surfaces and with other proteins. These interactions appear to be the reason why during sterilization a secondary membrane builds up on the filter surface which quickly leads to the clogging of the filters. A tangential flow across the filters can delay but not prevent clogging. For this reason, in the state of the art, a larger pore size than 0.2 μm is chosen so that together with the secondary membrane composed of casein aggregates and other milk proteins a state can be created such that the skimmed milk is largely filtered, while the bacteria are largely held out.

Due to the undefined nature of the secondary membrane it is understandable that a sterile, i.e., 100% germ-free filtrate, cannot be reliably achieved in this manner.

The problem, therefore, is to develop a process that will make it possible to remove all bacteria and spores from milk so that a sterile milk can be obtained which is as little as possible altered in its natural composition and contains as much as possible of all its biological activities.

This problem is solved in accordance with the invention by removing calcium ions from the milk and then sterilizing it by filtration.

It has been found surprisingly, therefore, that milk, regardless of the time it was obtained, can be subjected to a reliable sterilize filtration, resulting in a sterile, i.e., germ-free product.

The reduction of the $Ca^{++}$ ion concentration results in an alteration of the consistency of the milk, so that it now filters better and sterilize filtration through 0.2 μm filters becomes possible for the first time ever.

This is all the more surprising since, although the removal of calcium from milk has the concomitant effect of breaking down the casein micelles into smaller submicelles was known (Aoki, T. et al, Journal of Dairy Research, Vo. 55, 189–195, 1988), on the other hand the removal of calcium ions from skimmed milk, for example, produces a swelling of the individual micelles thereby increasing the viscosity of the skimmed milk (Snoeren, T., Milchwissenschaft, Vol. 39 (8), 461–463, 1984).

Just as surprising is the finding that the removal of the calcium ions reduces the tendency to form deposits on the filter surface and decidedly improves the filtration throughput.

Preferably, the milk is defatted to skimmed milk by conventional methods, such as centrifugation, before or after removal of the calcium ions, thereby permitting faster filtration.

The removal of the calcium ions can be performed by using ion exchanger materials, preferably cation exchangers such as CHELITE P (styrene-divinylbenzene matrix with aminomethylphosphonic acid groups, sodium form) or ACRISIT A 69 (styrene matrix with sulfonic acid groups, sodium form), or also by dialysis, preferably in the presence of chelating agents, such as citrate ions or EDTA.

After the milk is defatted it is quite especially preferred to remove the calcium ions through a cation exchanger, such as CHELITE P ($Na^+$), and then sterilize by filtration.

The calcium ion content is preferably reduced at least by one-half, especially by 50 to 90% of the initial content.

The sterilization can be performed by known methods, such as filtration or tangential filtration, using appropriate depth filters or membrane filters. Filterability can be improved if filter aids are used in the filtration, such as HYFLO SUPER-CEL.

If desired, the calcium ions can be re-added under sterile conditions after the sterile filtration, until the original, natural level is reached.

With the process according to the invention, normal milk originating especially from bovine or human milk can be processed later than 5 days after birth. It is especially preferred, however, to process even colostral milk from the first 5 days or 24 hours after birth and it can be diluted in an appropriate ratio, such as 1:1, with water.

The milk obtained by the process of the invention is but little changed in its natural composition; it has all its biological activities (cf. protein composition and antibody titer in Tables 1 and 2), while it is free of bacteria, fungi and spores and stable in the liquid state for months.

The invention will be further explained in the following illustrative Examples 1–6.

EXAMPLE 1

A representative sample of 5 liters of bovine milk defatted by centrifugation and taken from a pool of several thousand liters was passed through 500 ml of CHELITE P ($Na^+$) (Serva, Heidelberg) at a rate of 300 ml/min. Then 3% of HYFLO SUPER-CEL was added to the filtrate, and prefiltered through a SUPRA 80 filter (Seitz) (380 $cm^2$, flow rate 350 ml/min). The subsequent sterile filtration was performed through an EKS depth filter (Seitz) (380 $cm^2$, flow rate 300 ml/min). The pressure remained constant at the preset pressure of 1 bar. The full volume of 5 liters could thus be filtered clear and sterile through a total surface area of 380 $cm^2$ without problems.

The milk obtained was free of bacteria, fungi and spores and stable in the liquid state for more than 7 months. Its composition is given in Table 1.

TABLE 1

| Composition of the skimmed milk | Before filtration | After filtration |
| --- | --- | --- |
| Protein | 32 g/l | 29 g/l |
| Calcium | 30 mmol/l | 12 mmol/l |

Comparative Test

A sample taken from the same skimmed milk pool for comparison was filtered directly through SUPRA 80 and EKS. Even in the preliminary filtration through SUPRA 80 a definite increase of pressure up to 3 bar was observed during the filtration. The EKS sterile filter then clogged after only 800 ml.

EXAMPLE 2

A representative sample of 5 liters from a pool of 2000 liters of a bovine colostral milk defatted by centrifugation, which was obtained in the first 24 hours after calving, was diluted 1+1 with water and then passed through 500 ml of CHELITE P ($Na^+$ form) at a flow rate of 300 ml/min. Then 3% of HYFLO SUPER-CEL filter aid was added and the filtrate was prefiltered through SUPRA 80 filters (380 $cm^2$, flow rate 350 ml/min).

The sterile filtration that followed was performed through EKS depth filters (380 $cm^2$, flow rate 300 ml/min ). The pressure remained constant at the preset level of 1 bar. The entire volume of 5 liters was thus pre-filtered and sterilized by filtration through a total surface area of 380 $cm^2$ without any problem.

The milk obtained was free of bacteria, fungi and spores and was stable in the liquid state for more than 6 months. In particular, no difference was seen in the antibacterial activity of the immunoglobulins in comparison to the starting material. Its composition and biological activity are shown in Table 2.

TABLE 2

| Composition of the colostral milk | Before filtration | After filtration |
| --- | --- | --- |
| Protein | 41 g/l | 39 g/l |
| IgG | 23 g/l | 21 g/l |
| IgM | 2 g/l | 2 g/l |
| Calcium | 21 mmol/l | 9 mmol/l |
| Antibacterial antibody titer (passive hemagglutination) | | |
| Anti-E coli | 1:1280 | 1:1280 |
| Anti-Pseudomonas aeruginosa | 1:640 | 1:640 |
| Anti-Staph. aureus | 1:160 | 1:160 |

EXAMPLE 3

500 ml of CHELITE P ($Na^+$ form was added to 5 liters of a skimmed milk as in Example 1 and stirred for 30 minutes. After the CHELITE had settled the solution could be decanted and filtered as in Example 1 with the same result.

EXAMPLE 4

5 liters of bovine colostral skimmed milk as in Example 2 were passed undiluted through a column containing 500 ml of CHELITE P ($Na^+$ form) at a rate of 300 ml/min. The eluate was then sterilized by filtration as in Example 1. The rate of flow was 100 ml/min and the pressure rose to about 2.0 bar.

It was not possible to filter-sterile a control sample of the colostral skimmed milk without removing the calcium ions.

20 mmol of calcium chloride was added per liter to the filter-sterilized colostral skimmed milk under aseptic conditions. The colostral skimmed milk obtained was sterile and was stable for more than 6 months.

EXAMPLE 5

5 liters of normal milk defatted by centrifugation were passed through a column containing 500 ml of ACRISIT A 69 ($Na^+$ form) (Acris, Heidelberg). The rate of flow was 300 ml/min. The filtrate was then filtered as in Example 1, the flow rate being 350 ml/min. The pressure remained constant at the preset level of 1.0 bar.

EXAMPLE 6

500 ml of ACRISIT A 69 ($Na^+$ form) was added to 5 liters of a bovine colostral milk diluted 1+1 with water as in Example 2 and stirred for 30 minutes. After the ARCOSIT had settled out the solution was decanted and sterilized by filtration as in Example 2 with the same result.

EXAMPLE 7

1 liter of human mother's milk defatted by centrifugation at 4° C. was passed through a column containing 100 ml of ACRISIT A 69 ($Na^+$ form). The filtrate was then sterile-filtered directly through EKS depth filter (Seitz) (150 $cm^2$, flow rate 30 ml/min). The pressure remained constant at the preset level of 1 bar.

The mother's milk obtained was free of bacteria, fungi and spores and stable in the liquid state for more than 5 months.

TABLE 3

|  | Human mother's milk | After filtration |
|---|---|---|
| Protein | 19.4 g/l | 18.2 |
| IgA | 0.81 g/l | 0.77 g/l |
| Calcium | 6.8 mmol/l | 0.7 mmol/l |

A control sample from the same human milk pool was filtered directly through a 150 $cm^2$ EKS filter without removing the calcium ions. After only 150 ml the filter was clogged and the filtration could not be completed.

The commercial names not hereinabove defined have reference to the following:

| HYFLO SUPERCEL: | Flux-Calcined Diatomaceous Earth Filter Aid |
|---|---|
| SUPRA 80 filter: | Depth filter with an agglomeration of cellulose fibres |

It will be appreciated that the instant specification and the claims are set forth by way of illustration and not limitation, and that various modifications and changes may be made without departing from the spirit and scope of the present invention.

We claim:

1. A method for obtaining a sterile milk which is substantially unchanged in its biological activities, which comprises removing calcium ions from the milk and then filtering said milk thereby to effect removal of bacteria, fungi and spores which may be present.

2. The method according to claim 1, including the additional step of defatting the milk before or after the removal of calcium ions.

3. The method according to claim 1, wherein the removal of the calcium ions is effected by contact with a solid support which affixes the calcium ions.

4. The method according to claim 3, wherein the solid support comprises a cation exchanger.

5. The method according to claim 4, wherein the cation exchanger comprises the sodium form of (a) a polymer of styrene/divinylbenzene with pendant aminomethylphosphonic acid groups or (b) a styrene polymer with pendant sulfonic acid groups.

6. The method according to claim 1, wherein the removal of the calcium ions is effected by dialysis.

7. The method according to claim 6, wherein the milk is subjected to chelation with citrate prior to dialysis.

8. The method according to claim 1, wherein at least about half the calcium content of the starting milk is removed.

9. The method according to claim 1, including the further step of adding calcium ions to the sterile filtered milk.

10. The method according to claim 1, wherein the milk is cow's milk.

11. The method according to claim 1, wherein the milk is mother's milk.

12. The method according to claim 1, wherein the milk which is treated is collected no later than five days after birth.

13. The method according to claim 1, wherein the milk which is treated is collected within 24 hours after birth.

14. The method according to claim 1, wherein the milk which is treated is collected at least five days after birth.

15. The method according to claim 1, wherein the sterile filtration is effected with a depth filter or membrane filter.

16. The method according to claim 1, wherein the sterile filtration is effected in the presence of a filter aid.

17. The method according to claim 16, wherein the filter aid comprises diatomaceous earth.

18. The method according to claim 8, including the additional step of defatting the milk before or after the removal of calcium ions wherein the removal is effected by (i) chelation with citrate followed by dialysis, or (ii) with a cation exchanger which comprises the sodium form of (a) a polymer of styrene/divinylbenzene with pendant aminomethylphosphonic acid groups or (b) a styrene polymer with pendant sulfonic acid groups, before the filtration with a depth filter or membrane filter in the presence of diatomaceous earth as a filter aid.

* * * * *